(12) United States Patent
Kang et al.

(10) Patent No.: US 9,171,407 B2
(45) Date of Patent: Oct. 27, 2015

(54) SYSTEM AND METHOD OF DETECTING FUSE DISCONNECTION OF DC-DC CONVERTER

(71) Applicant: Hyundai Motor Company, Seoul (KR)

(72) Inventors: Gun Soo Kang, Gyeonggi-do (KR); Ki Jong Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 98 days.

(21) Appl. No.: 13/864,650

(22) Filed: Apr. 17, 2013

(65) Prior Publication Data

US 2014/0188315 A1  Jul. 3, 2014

(30) Foreign Application Priority Data

Dec. 28, 2012  (KR) .................. 10-2012-0156062

(51) Int. Cl.
| | | |
|---|---|---|
| *G07C 5/00* | (2006.01) | |
| *B60L 3/00* | (2006.01) | |
| *B60W 10/26* | (2006.01) | |
| *B60W 20/00* | (2006.01) | |

(52) U.S. Cl.
CPC .................. *G07C 5/00* (2013.01); *B60L 3/0023* (2013.01); *B60W 10/26* (2013.01); *B60W 20/50* (2013.01); *Y10S 903/93* (2013.01)

(58) Field of Classification Search
CPC ....... G07C 5/00; B60L 11/123; B60L 3/0046; H01M 10/482; H02J 7/0018; H02J 7/0054
USPC .......... 701/22, 36; 702/63; 320/116, 134, 152
See application file for complete search history.

(56) References Cited

U.S. PATENT DOCUMENTS

| | | | | |
|---|---|---|---|---|
| 7,409,276 | B2 * | 8/2008 | Nishina et al. | 701/36 |
| 8,096,377 | B2 * | 1/2012 | Sato | 180/65.275 |
| 8,174,241 | B2 * | 5/2012 | Kojima et al. | 320/134 |
| 8,207,704 | B2 * | 6/2012 | Kai et al. | 320/116 |
| 8,228,037 | B2 * | 7/2012 | Furukawa et al. | 320/134 |
| 8,315,828 | B2 * | 11/2012 | Tae | 702/63 |
| 8,681,457 | B2 * | 3/2014 | Minegishi et al. | 361/18 |
| 8,829,717 | B2 * | 9/2014 | Kudo et al. | 307/77 |
| 2003/0102673 | A1 * | 6/2003 | Nada | 290/40 C |
| 2003/0230443 | A1 * | 12/2003 | Cramer et al. | 180/65.5 |
| 2008/0061764 | A1 * | 3/2008 | Tae et al. | 324/72 |

(Continued)

FOREIGN PATENT DOCUMENTS

| | | |
|---|---|---|
| JP | 10-094156 | 4/1998 |
| JP | 2008041425 A | 2/2008 |

(Continued)

*Primary Examiner* — Thomas G Black
*Assistant Examiner* — Wae Louie
(74) *Attorney, Agent, or Firm* — Mintz Levin Cohn Ferris Glovsky and Popeo, P.C.; Peter F. Corless

(57) ABSTRACT

A system and method that compares an input voltage value through the input terminal of the LDC with a setting voltage in an ignition on-state and an on-state of a main relay for connection of a high-voltage battery Then a verification is made whether the main relay is in the on-state and whether the voltage of an input capacitor in an inverter is in a normal voltage range. As a result a diagnosis is made whether the disconnection of the input fuse has occurred in a low-voltage state when the input voltage is no more than the setting voltage and the on-state of the main relay and the state in which the voltage of the input capacitor in the inverter is in the normal voltage range.

18 Claims, 3 Drawing Sheets

(56) References Cited

U.S. PATENT DOCUMENTS

| | | | |
|---|---|---|---|
| 2009/0308675 A1* | 12/2009 | Sato | 180/65.285 |
| 2010/0004807 A1* | 1/2010 | Kydd | 701/22 |
| 2010/0121511 A1* | 5/2010 | Onnerud et al. | 701/22 |
| 2010/0127663 A1* | 5/2010 | Furukawa et al. | 320/134 |
| 2010/0268493 A1* | 10/2010 | Tae | 702/63 |
| 2012/0303213 A1* | 11/2012 | Prosser et al. | 701/36 |
| 2013/0046426 A1* | 2/2013 | Tsukashima et al. | 701/22 |
| 2014/0188315 A1* | 7/2014 | Kang et al. | 701/22 |

FOREIGN PATENT DOCUMENTS

| | | |
|---|---|---|
| JP | 2008296863 A | 12/2008 |
| JP | 2010230678 A | 10/2010 |
| KR | 1020080037223 | 4/2008 |
| KR | 10-2011-0077387 | 7/2011 |
| KR | 10-2012-0077137 | 7/2012 |

\* cited by examiner

SYSTEM AND METHOD OF DETECTING FUSE DISCONNECTION OF DC-DC CONVERTER

CROSS-REFERENCE TO RELATED APPLICATION

This application claims under 35 U.S.C. §119(a) the benefit of Korean Patent Application No. 10-2012-0156062 filed Dec. 28, 2012, the entire contents of which are incorporated herein by reference.

BACKGROUND (a) Technical Field

The present invention relates to a system and method of detecting fuse disconnection of a DC-DC converter. More particularly, the present invention relates to a system and method that detects disconnection of an input fuse of a low-voltage DC-DC converter (LDC) without adding a separate hardware in a green vehicle such as an electric vehicle or hybrid electric vehicle.

(b) Background Art

Green vehicles that may replace existing internal-combustion engine vehicles have been actively developed due to a high oil prices, control of carbon dioxide, etc. Both electric vehicles (EV) driven by an electric motor and hybrid electric vehicles (HEV) driven by an internal-combustion engine and an electric motor as a driving source have become commercialized or on their way to commercialization according to manufacturers.

EVs and HEVs typically include a high-voltage battery (main battery) mounted therein. The high-voltage battery (main battery) is a power source that supplies electric power to an electric motor (traction motor) that acts as a driving source. In addition, EVs and HEVs also typically have a charging device that charges a battery, a motor control unit (MCU) (i.e., a type of controller) including an inverter that drives an electric motor (hereinafter, referred to as a 'driving motor'), etc.

Here, the MCU converts DC voltage into three-phase power through the inverter by controlling the driving of switching elements in the inverter, so that each phase current can be applied to the driving motor. The MCU includes an input capacitor connected to a DC link terminal in the inverter so as to be charged by the voltage supplied from the high-voltage battery.

A battery management system (BMS) monitoring the state of the high-voltage battery is mounted in the EV and HEV. The BMS collects battery state information on the temperature, voltage, charging/discharging current and state of charge (SOC) of the battery, and provides the collected battery state information to another controller in the vehicle so that the battery state information can be used to control the vehicle.

Particularly, the BMS manages the state of the battery to maintain a certain level or more by verifying the state of the battery, and prevents the lifespan of the battery from being shortened by the degradation of the durability of the battery. In addition, the BMS notifies a vehicle control unit (VCU) (e.g., a different controller) performing integration control of information on the SOC of the battery, so that the traveling of the vehicle can be performed in consideration of the state of the battery.

A power relay assembly (PRA) is provided on a high-voltage circuit connecting the high-voltage battery to the DC link terminal of the MCU (inverter). The PRA performs switching so that the power of the high-voltage battery is selectively supplied to the vehicle. The PRA includes a main relay that is a main power contact, a precharge relay mounted on the circuit bypassing the main relay, a pre-charge resistor, etc. The on/off driving of the relays is controlled according to a control signal output by the BMS.

In addition, a hybrid control unit (HCU), an auxiliary battery (low-voltage battery) supplying a low-voltage electric load, a low-voltage DC-DC converter (LDC) performing power conversion between the high-voltage battery and the auxiliary battery, etc. are mounted in the vehicle. Here, the HCU is the highest level controller that collects various kinds of information in the vehicle and performs a control of the vehicle by communicating with other controllers such as the MCU or the BMS. Basically, the controllers in the vehicle execute the control of the vehicle while transmitting/receiving information therebetween through a communication network.

Meanwhile, the LDC charges the auxiliary battery by transforming DC power supplied from the high-voltage battery in an ignition on-state and an on-state of the main relay. An input fuse is connected to a primary input terminal to which the power of the high-voltage battery is input in the LDC. In a case where the input fuse is disconnected, the operation of the LDC is impossible due to disconnection of the input terminal of a high-voltage power source. In this case, the charging of the auxiliary battery is impossible, and vehicle operation is difficult due to discharging of the auxiliary battery.

In an ordinary vehicle, a fuse is connected to various kinds of electrical components including the LDC through a wiring harness. In addition, a hardware element for detecting disconnection of the fuse is provided to each electrical component. For example, the disconnection of the fuse is detected by adding a separate analog circuit such as a sensing circuit or a comparator comparing voltages between both ends of the fuse.

However, the amount of room in a vehicle into which a component can be inserted is restricted, and thus packaging of the components is severely restricted. Particularly, when the analog circuit (comparator or sensing circuit) is added to the LDC in which the fuse is mounted on a printed circuit board (PCB) in an electric field component, the analog circuit occupies a large area on the PCB, and costs are incurred due to the addition of the circuit.

SUMMARY OF THE DISCLOSURE

The present invention provides a system and method that detects disconnection of an input fuse of a low-voltage DC-DC converter (LDC) without adding additional hardware in a green vehicle such as an electric vehicle or hybrid electric vehicle.

In one aspect, the present invention provides a method for detecting disconnection of an input fuse connected to an input terminal of an LDC, including: comparing, by a controller, an input voltage value through the input terminal of the LDC with a setting voltage in an ignition on-state and an on-state of a main relay for connection of a high-voltage battery; verifying, by the controller, whether the main relay is in the on-state; verifying, by the controller, whether the voltage of an input capacitor in an inverter is in a normal voltage range; and diagnosing, by the controller, that the disconnection of the input fuse occurred in a low-voltage state in which the input voltage was no more than the setting voltage in addition to the on-state of the main relay and the state in which the voltage of the input capacitor in the inverter is in the normal voltage range.

In an exemplary embodiment, the disconnection of the input fuse may be diagnosed when the low-voltage state in which the input voltage is no more than the setting voltage in addition to the on-state of the main relay and the state in which the voltage of the input capacitor in the inverter is in the normal voltage range is maintained for a set period of time.

In another exemplary embodiment, a converter controller controlling the operation of the LDC may compare the input voltage with the setting voltage. The converter controller may verify the on-state of the main relay by receiving information on the on/off state of the main relay from a battery management system (BMS). The converter controller may receive information on the voltage of the input capacitor in the inverter from a motor control unit (MCU) and verify whether the voltage of the input capacitor is in the normal voltage range, thereby diagnosing whether the disconnection of the input fuse has occurred.

In still another exemplary embodiment, when the converter controller diagnoses that the disconnection of the input fuse has occurred, the converter controller may perform a control process that turns on a charging warning lamp and a service lamp in a cluster.

In yet another exemplary embodiment, the converter controller may request a hybrid control unit (HCU) to turn on the charging warning lamp, and the HCU may turn on relay so that power for turning on the charging warning lamp is supplied, thereby turning on the charging warning lamp.

In still yet another exemplary embodiment, the converter controller may request a cluster controller to turn on the service lamp, and the cluster controller may turn on the service lamp.

In a further exemplary embodiment, when the information on the voltage of the input capacitor in the inverter is not received through communication between the converter controller and the MCU, the converter controller may control the HCU to turn on a warning lamp of a vehicle cluster while controlling the operation of the LDC so that a constant voltage is output.

In another further exemplary embodiment, when the occurrence of a failure of the LDC including the disconnection of the input fuse is detected, the converter controller may control the HCU to turn on a warning lamp of another color so that the failure of the LDC is distinguished from a communication error.

Advantageously, the converter controller (LDC controller) can detect disconnection of the input fuse connected to the high-voltage input terminal of the LDC, based on information on the on/off-state of the main relay, transmitted from the BMS and information on the voltage of the input capacitor, transmitted from the MCU, without adding a separate hardware.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
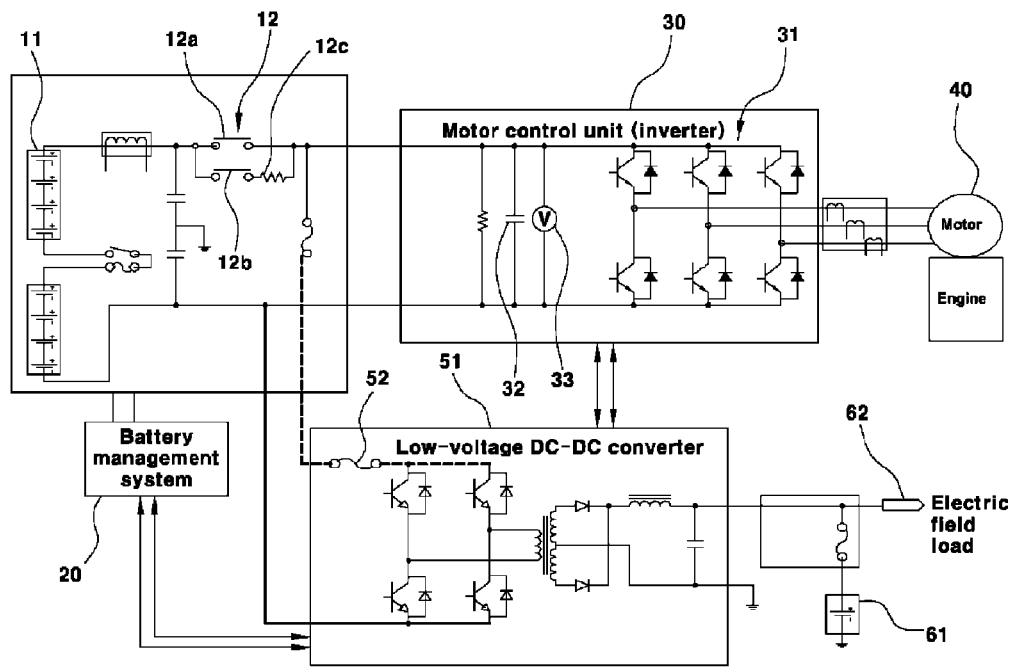
FIG. 1 is a schematic view illustrating the configuration of a system to which a method for detecting fuse disconnection is applied according to an exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that the below methods are executed by at least one controller (e.g., a converter controller). The term controller refers to a hardware device that includes a memory and a processor. The memory is configured to store the modules/units and the processor is specifically configured to execute said modules/units to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The present invention provides a system and method that detects disconnection of an input fuse 52 of a low-voltage DC-DC converter (LDC) 51 in a green vehicle such as an electric vehicle (EV) or hybrid electric vehicle (HEV). In the exemplary embodiment of the present invention, a controller, e.g., a converter controller 50 (LDC controller) detects the disconnection of the input fuse 52 connected to a high-voltage input terminal of the LDC 51, based on information on the on/off state of a main relay 12a transmitted from a battery management system (BMS) 20, and information on the voltage of an input capacitor 32 transmitted from a motor control unit (MCU) 30.

Figure 2:
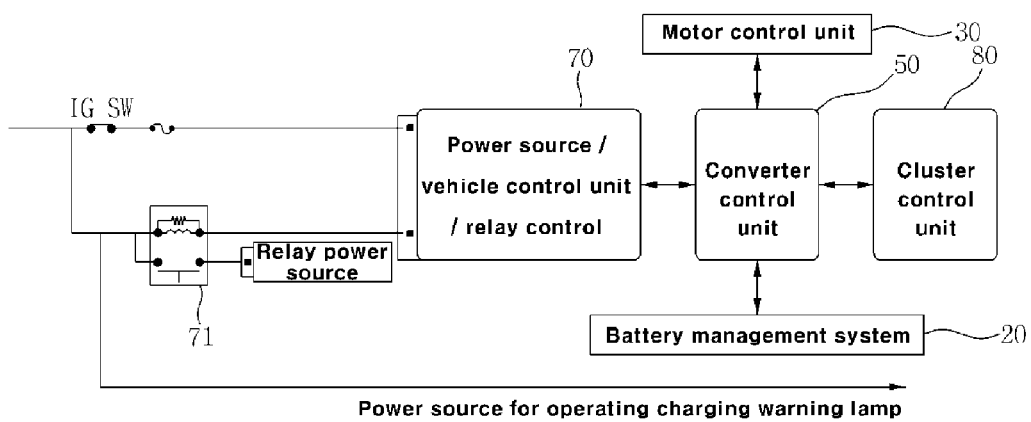
FIG. 2 is a schematic view illustrating controllers that perform the method for detecting fuse disconnection according to the exemplary embodiment of the present invention.

FIG. 1 is a schematic view illustrating the configuration of a system to which a method for detecting fuse disconnection is applied according to an exemplary embodiment of the present invention. FIG. 2 is a schematic view illustrating controllers that perform the method for detecting fuse disconnection according to the exemplary embodiment of the present invention.

Referring to FIG. 1, there are shown a high-voltage battery (main battery) 11 and a power relay assembly (PRA) 12 (e.g., a power source connecting device between the high-voltage battery and an inverter/LDC) that performs switching so that the power of the high-voltage battery 11 is selectively supplied. The PRA 12 includes a main relay 12a, a precharge relay 12b and a precharge resistor 12c.

In FIG. 1, there is also shown a BMS 20 that collects battery state information related to the temperature, voltage, charging/discharging current and state of charge (SOC) of the high-voltage battery 11, and transmits the collected battery state information to another controller in a vehicle. The BMS 20 controls relay-on/off driving of the PRA 12. Particularly, in the present invention, the BMS 20 transmits information on the on/off state of the main relay 12a to a converter controller (e.g., a LDC controller) (50 of FIG. 2) through controller area network (CAN) communication. That is, when the BMS 20 turns on the main relay 12a after an ignition on-state, the BMS 20 transmits information on the on-state of the main relay 12a to the converter controller 50 through the CAN communication.

Referring to FIG. 1, there is shown a driving motor 40 driven by receiving electric power supplied from the high-voltage battery 11, and a motor control unit (MCU) 30 including an inverter for driving the driving motor 40. In the inverter 31 of the MCU 30, an input capacitor 32 charged by the voltage supplied from the high-voltage battery 11 is connected to a DC link terminal. More specifically, the MCU 30 is configured to sense a voltage of the input capacitor 32 in the inverter 31 (e.g., voltage at both terminals of the input capacitor) through a voltage detector 33 and receive the sensed voltage input from the voltage detector 33.

Referring to FIG. 1, there are shown an LDC (e.g., DC conversion device for charging an auxiliary battery) 51, an auxiliary battery 61 and a low-voltage electric load 62 of the vehicle. A high-voltage input terminal of the LDC 51 is connected to a high-voltage circuit connected to the rear terminal of the main relay 12a.

Accordingly, the LDC 51 charges the auxiliary battery 61 or supplies electric power to the low-voltage electric load 62 by transforming the high-voltage DC power supplied from the high-voltage battery 11 in an ignition on-state and an on-state of the main relay 12a. The auxiliary battery 61 supplies operation power to the electric load 62 in a state in which the auxiliary battery 61 is charged by the LDC 51. In the LDC 51, an input fuse 52 is connected to a primary input terminal to which the voltage of the high-voltage battery 11 is input.

Meanwhile, FIG. 2 is a schematic view illustrating controllers that perform the method for detecting fuse disconnection according to the exemplary embodiment of the present invention, in which there are shown a hybrid control unit (HCU) 70, the converter controller (LDC controller) 50, the BMS 20, the MCU 30 and a cluster controller 80. The detection of disconnection of the input fuse (52 of FIG. 1) and the warning of a failure are performed under the mutual control of the controllers.

Here, the converter controller 50 uses information on the on/off state of the main relay (12a of FIG. 1) transmitted from the BMS 20 through the CAN communication in order to detect disconnection of the input fuse 52. In addition, the converter controller 50 uses information on the voltage of the input capacitor (32 of FIG. 1) transmitted from the MCU 30 through the CAN communication. When it is diagnosed that a failure such as disconnection of the input fuse 52 has occurred in the LDC (51 of FIG. 1), the converter controller 50 generates and stores a diagnostic trouble code (DTC) and allows a lamp in a cluster to be turned on, thereby alarming the state of the failure.

As described above, the discharging of the auxiliary battery (61 of FIG. 1), caused by the non-operation of the LDC 51, is notified in advance through the cluster, so that it is possible to improve driver safety, to represent a converter DTC and to cope with the failure.

Referring to FIG. 2, there is shown a hardware element for turning on a charging warning lamp (not shown) in the cluster, as well as the controllers. When it is diagnosed that a failure such as disconnection of the input fuse has occurred in the LDC, the converter controller 50 turns on the charging warning lamp to notify a driver of the situation in which the charging of the auxiliary battery is impossible, thereby alarming the state of the failure.

In this case, the converter controller 50 requests the HCU 70 to turn on the charging warning lamp through the CAN communication. Accordingly, the HCU 70 turns on a relay 71 so that relay power is supplied to the charging warning lamp in the cluster, thereby turning on the charging warning lamp.

A service lamp (not shown) is turned on to induce the driver to repair the detected failure. If the converter controller 50 detects the occurrence of a failure, the converter controller 50 generates and stores a DTC and then requests the cluster controller 80 to turn on the service lamp in the cluster through the CAN communication. Accordingly, the cluster controller 80 turns on the service lamp, thereby notifying the driver of the failure.

When the converter controller 50 detects the non-operation of the LDC and disconnection of the input fuse, the converter controller 50 allows the charging warning lamp and the service lamp to be turned on, thereby easily performing A/S maintenance and causing analysis to be initiated.

Figure 3:
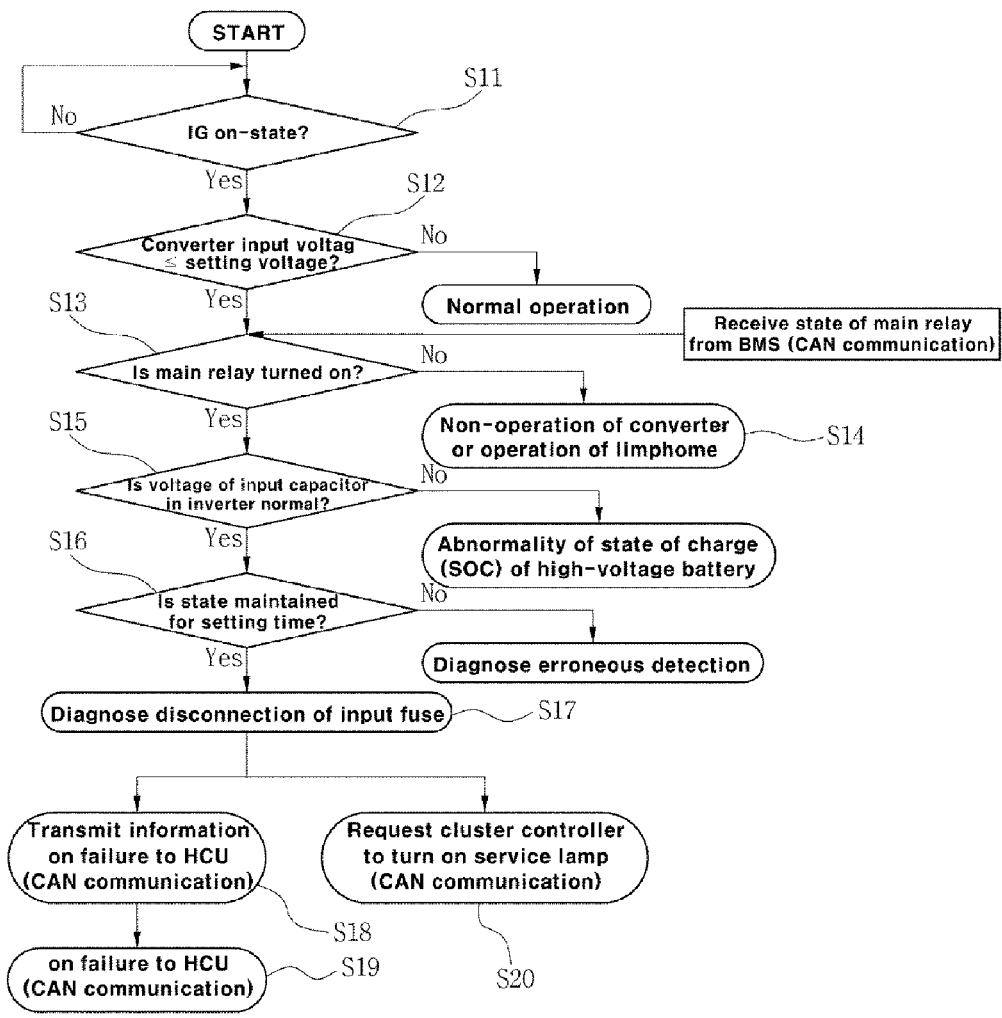
FIG. 3 is a flowchart illustrating the method for detecting fuse disconnection according to the exemplary embodiment of the present invention.

FIG. 3 is a flowchart illustrating the method for detecting fuse disconnection according to the exemplary embodiment of the present invention. The method according to the exemplary embodiment of the present invention will be described with reference to FIG. 3.

In the conventional method, fuse disconnection is detected through hardware by sensing and comparing voltage at both terminals of the input fuse in the LDC. However, in the present invention, fuse disconnection is detected under the mutual control of a plurality of controllers. That is, the fuse disconnection is detected, based on information transmitted through the CAN communication between the controllers. In addition, the failure state of the fuse disconnection is displayed through the cluster under the mutual control of the controllers (e.g., the charging warning lamp and the service lamp are turned on).

First, after an ignition on-state (S11), electric power is supplied to the converter controller 50, and simultaneously, the BMS 20 turns on the main relay 12a. Accordingly, the high-voltage battery 11 is connected so that the high-voltage input capacitor 32 in the inverter 31 is charged by the voltage applied from the high-voltage battery 11. Subsequently, the converter controller 50 compares an input voltage value through the high-voltage input terminal to which the input fuse 52 is connected with a predetermined setting voltage (S12). When a voltage value lower than the setting voltage is input, the controller diagnoses that a failure has occurred.

Subsequently, the converter controller 50 receives information related to the on/off state of the main relay 12a from the BMS 20 through the CAN communication when it is diagnosed that a low-voltage failure has occurred. If the main relay 12a is in an off-state, the main relay 12a is not previously turned on. Hence, the LDC 51 is not operated, or the main relay 12a is unintentionally turned on. Therefore, a limphome operation mode is performed (S13 and S14).

On the other hand, when the information on the on-state of the main relay is input when it is diagnosed that the low-voltage failure has occurred, the converter controller 50 receives information relating to the voltage of the input capacitor 32, sensed by the voltage detector, from the MCU 30 through the CAN communication (the MCU transmits the information on the voltage sensed by the voltage detector to the converter controller) (S13).

Here, when the voltage of the input capacitor 32 is in an SOC region of the high-voltage battery 11, e.g., when the voltage of the input capacitor 32 is in a normal voltage range, the converter controller 50 verifies whether such a state is maintained for a predetermined set period of time (e.g., 10 seconds) so as to avoid erroneous detection (S15 and S16). When the state is maintained even after the set time elapses, the converter controller 50 verifies that the disconnection of the input fuse 52 has been detected (S17). The converter controller 50 then generates a DTC of the fuse disconnection and stores a failure message.

That is, when the low-voltage state of the input voltage is maintained for the set period of time even though the main relay 12a is in the on-state and the voltage of the input capacitor 32 is in the normal voltage range, the converter controller 50 diagnoses that the disconnection of the input fuse 52 has occurred.

When it is diagnosed that the disconnection of the input fuse 52 has occurred, the converter controller 50 transmits information on the failure (e.g., message for the non-operation of the LDC) to the HCU 70 through the CAN communication, and requests the HCU 70 to turn on the charging warning lamp in the cluster (S18). The HCU 70 turns on the relay 71 shown in FIG. 2 in response to the request, thereby turning on the warning charging lamp (S19). In addition, the converter controller 50 requests the cluster controller 80 to turn on the service lamp through the CAN communication (S20), and accordingly, the service lamp can be turned on.

When the converter controller 50 detects the disconnection of the input fuse, the converter controller 50 controls the HCU 70 to turn on the charging warning lamp and the service lamp so that the driver can recognize that a failure has occurred. In the above description, it has been illustrated that the converter controller 50 receives the information on the sensed voltage of the input capacitor 32 from the MCU 30 through the CAN communication. Thus, when the converter controller 50 does not receive the information related to the voltage from the MCU 30 due to an error in the CAN communication, the converter controller 50 controls the operation of the LDC 51 to output a certain voltage (e.g., 13.9V), like the occurrence of an error in an ordinary CAN communication. Simultaneously, the converter controller 50 controls the HCU 70 to turn on a warning lamp (e.g., a yellow warning lamp) on a vehicle cluster.

When the HCU 70 or the MCU 30 does not receive CAN information from the converter controller 50 for a certain period of time due to an error in the CAN communication, the HCU 70 or the MCU 30 turns on the warning lamp of the vehicle cluster.

When an error in the CAN communication occurs, the LDC 51 is operated at a constant output voltage as described above, and the warning lamp (e.g., a yellow warning lamp) is turned on in the cluster. In a case where the LCD 51 is in a non-operation state in which the LDC 51 does not output the constant voltage due to the disconnection of the input fuse (e.g., detected by the method of the present invention) or a failure in another converter (e.g., the converter controller detects the failure by performing an ordinary self-diagnosis logic), the converter controller 50 controls the HCU 70 to turn on another warning lamp (e.g., a red warning lamp). Thus, a warning is performed by distinguishing an error in the CAN communication from a hardware failure in the converter including a fuse or the like. Accordingly, the driver can distinguish the error in the CAN communication from the hardware failure easily.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A method of detecting disconnection of an input fuse connected to an input terminal of a low-voltage DC-DC converter (LDC), the method comprising:
    comparing, by a controller, an input voltage value through the input terminal of the LDC with a setting voltage in an ignition on-state and an on-state of a main relay for connection of a high-voltage battery;
    verifying, by the controller, whether the main relay is in the on-state;
    verifying, by the controller, whether the voltage of an input capacitor in an inverter is in a normal voltage range; and
    diagnosing, by the controller, that a disconnection of the input fuse connected to the input terminal of the LDC has occurred in a low-voltage state in which the input voltage value is no more than the setting voltage, the main relay is in the on-state, and the voltage of the input capacitor in the inverter is in the normal voltage range,
    wherein the input fuse is connected to the input terminal of the LDC to which a voltage of the high-voltage battery is input.

2. The method of claim 1, wherein the disconnection of the input fuse is diagnosed when the input voltage is more than the setting voltage when the main relay in the on-state and the voltage of the input capacitor in the inverter in the normal voltage range are maintained for a set period time.

3. The method of claim 1, wherein the controller is a converter controller that controls the operation of the LDC and compares the input voltage with the setting voltage,
    wherein the converter controller verifies the on-state of the main relay by receiving information on the on/off state of the main relay from a battery management system (BMS), and
    wherein the converter controller receives information on the voltage of the input capacitor in the inverter from a motor control unit (MCV) and verifies whether the voltage of the input capacitor is in the normal voltage range, thereby diagnosing whether the disconnection of the input fuse occurs.

4. The method of claim 3, wherein, when the converter controller diagnoses that the disconnection of the input fuse has occurred, the converter controller performs a control process for turning on a charging warning lamp and a service lamp in a cluster.

5. The method of claim 4, wherein the converter controller requests a hybrid control unit (RCV) to turn on the charging warning lamp, and the RCV turns on a relay so that power for turning on the charging warning lamp is supplied, thereby turning on the charging warning lamp.

6. The method of claim 4, wherein the converter controller requests a cluster controller to turn on the service lamp, and the cluster controller turns on the service lamp.

7. The method of claim 3, wherein, when the information on the voltage of the input capacitor in the inverter is not received through communication between the converter controller and the MCV, the converter controller controls the RCV to turn on a warning lamp of a vehicle cluster while controlling the operation of the LDC so that a constant voltage is output.

8. The method of claim 7, wherein, when a failure of the LDC, including the disconnection of the input fuse, is detected, the converter controller controls the RCV to turn on a warning lamp of another color so that the failure of the LDC is distinguished from a communication error.

9. A system comprising:
a controller area network (CAN) in communication with a plurality of controllers in a vehicle; and
a controller configured to:
compare an input voltage value through an input terminal of a low-voltage DC-DC converter (LDC) with a setting voltage in an ignition on-state and an on-state of a main relay for connection of a high-voltage battery,
verify whether the main relay is in the on-state,
verify whether the voltage of an input capacitor in an inverter is in a normal voltage range, and
diagnose that a disconnection of an input fuse connected to the input terminal of the LDC has occurred in a low-voltage state in which the input voltage value is no more than the setting voltage, the main relay is in the on-state, and the voltage of the input capacitor in the inverter is in the normal voltage range,
wherein the input fuse is connected to the input terminal of the LDC to which a voltage of the high-voltage battery is input.

10. The system of claim 9, wherein the disconnection of the input fuse is diagnosed when the input voltage is more than the setting voltage when the main relay in the on-state and the voltage of the input capacitor in the inverter in the normal voltage range are maintained for a set period time.

11. The system of claim 9, wherein the controller is a converter controller controlling the operation of the LDC,
wherein the converter controller verifies the on-state of the main relay by receiving information on the on/off state of the main relay from a battery management system (BMS), and
wherein the converter controller receives information on the voltage of the input capacitor in the inverter from a motor control unit (MCV) and verifies whether the voltage of the input capacitor is in the normal voltage range, thereby diagnosing whether the disconnection of the input fuse occurs.

12. The system of claim 11, wherein, when the converter controller diagnoses that the disconnection of the input fuse has occurred, the converter controller performs a control process for turning on a charging warning lamp and a service lamp in a cluster.

13. The system of claim 12, wherein the converter controller requests a hybrid control unit (RCV) to turn on the charging warning lamp, and the RCV turns on a relay so that power for turning on the charging warning lamp is supplied, thereby turning on the charging warning lamp.

14. The system of claim 12, wherein the converter controller requests a cluster controller to turn on the service lamp, and the cluster controller turns on the service lamp.

15. The system of claim 11, wherein, when the information on the voltage of the input capacitor in the inverter is not received through communication between the converter controller and the MCV, the converter controller controls the RCV to turn on a warning lamp of a vehicle cluster while controlling the operation of the LDC so that a constant voltage is output.

16. The system of claim 9, wherein, when a failure of the LDC including the disconnection of the input fuse, is detected, the converter controller controls the RCV to turn on a warning lamp of another color so that the failure of the LDC is distinguished from a communication error.

17. A non-transitory computer readable medium containing program instructions executed by a controller, the computer readable medium comprising:
program instructions that compare an input voltage value through the input terminal of a low-voltage DC-DC converter (LDC) with a setting voltage in an ignition on state and an on-state of a main relay for connection of a high-voltage battery;
program instructions that verify whether the main relay is in the on-state;
program instructions that verify whether the voltage of an input capacitor in an inverter is in a normal voltage range; and
program instructions that diagnose that a disconnection of an input fuse connected to the input terminal of the LDC has occurred in a low-voltage state in which the input voltage value is no more than the setting voltage, the main relay is in the on-state, and the voltage of the input capacitor in the inverter is in the normal voltage range,
wherein the input fuse is connected to the input terminal of the LDC to which a voltage of the high-voltage battery is input.

18. The non-transitory computer readable medium of claim 17, wherein the disconnection of the input fuse is diagnosed when the input voltage is more than the setting voltage when the main relay in the on-state and the voltage of the input capacitor in the inverter in the normal voltage range are maintained for a set period time.

* * * * *